(12) United States Patent
Tanaka

(10) Patent No.: US 7,248,655 B2
(45) Date of Patent: Jul. 24, 2007

(54) DIGITAL RADIO RECEIVER

(75) Inventor: Tomohisa Tanaka, Kobe (JP)

(73) Assignee: TOA Corporation, Kobe-shi (JP)

( * ) Notice: Subject to any disclaimer, the term of this patent is extended or adjusted under 35 U.S.C. 154(b) by 362 days.

(21) Appl. No.: 10/512,371

(22) PCT Filed: Apr. 24, 2003

(86) PCT No.: PCT/JP03/05235

§ 371 (c)(1),
(2), (4) Date: Oct. 25, 2004

(87) PCT Pub. No.: WO03/092179

PCT Pub. Date: Nov. 6, 2003

(65) Prior Publication Data

US 2005/0169410 A1 Aug. 4, 2005

(30) Foreign Application Priority Data

Apr. 26, 2002 (JP) ............................. 2002-125872

(51) Int. Cl.
*H03D 1/04* (2006.01)
(52) U.S. Cl. .................... 375/346; 375/227
(58) Field of Classification Search ................. 375/346
See application file for complete search history.

(56) References Cited

U.S. PATENT DOCUMENTS 6,518,897 B1 * 2/2003 Bradford .................... 341/111
6,961,395 B2 * 11/2005 Fuller et al. ................. 375/350
2003/0219069 A1 * 11/2003 Chen et al. .................. 375/227
2004/0071240 A1 * 4/2004 Betts ........................... 375/346

FOREIGN PATENT DOCUMENTS

JP 2000-049720 * 2/2000
JP 2002-051119 2/2002

* cited by examiner

*Primary Examiner*—Leon-Viet Q Nguyen
(74) *Attorney, Agent, or Firm*—Duane Morris LLP

(57) ABSTRACT

A receiving unit (2) receives a modulated signal resulting from modulating a carrier signal with a digital encoded train resulting from error-correction encoding a digital signal train. A demodulating unit (4) demodulates the digital encoded train from the received modulated signal. A decoding unit (8) decodes the digital signal train from the demodulated digital encoded train. The receiving unit (2) outputs a received-signal strength indicative signal indicative of the received-signal strength of the modulated signal. During demodulating, a bit error rate computing unit (18) of the decoding unit (8) computes a bit error rate. The received-signal strength indicative signal and the bit error rate are inputted to a control unit (14), and, on the basis of these inputs, it is judged which one of the receiving conditions defined by received-signal strength indicative signals and bit error rates, the current receiving condition corresponds to.

2 Claims, 4 Drawing Sheets

DIGITAL RADIO RECEIVER

TECHNICAL FIELD

This invention relates to a receiver for receiving a modulated signal comprising a carrier signal modulated with a digital signal, and, more particularly, to a digital wireless receiver which can give indication of a signal receiving condition.

BACKGROUND OF THE INVENTION

Digital wireless transmission is sometimes used to transmit analog audio frequency signals and analog video signals. In digital wireless transmission, a digital signal train produced by digitizing an audio frequency signal or video signal is error-correction encoded to thereby develop a digital encoded train in a transmitter. With this digital encoded train, a carrier signal, which is a high-frequency signal, is modulated to provide a modulated signal. The modulated signal is transmitted through a transmitting antenna. At a receiver side, the modulated signal received by a receiving antenna is demodulated to provide the digital encoded train, from which the digital signal train is decoded. The decoded, digital signal train is converted back into the analog audio frequency signal or analog video signal in a digital-to-analog converter.

In wireless transmission where a transmitter and a receiver are used, a communication area in which proper wireless transmission is available is determined by transmission power of the transmitter and sensitivity of the receiver. Therefore, a receiver in such communication area cannot satisfactorily receive well a modulated signal from a transmitter outside the communication area. Because radio frequencies available for wireless microphones, when used as such transmitter, are limited, the frequency to be used for the wireless microphone must be selected from such frequencies. When the wireless microphone is being operated at one frequency, there may be an apparatus operating at the same frequency or at a frequency which interferes with the frequency of the wireless microphone. In such a case, a receiver for that wireless microphone cannot properly receive the modulated signal from the wireless microphone.

If the transmitter transmits the modulated signal from outside the communication area, or if the receiver is receiving the modulated signal transmitted from the transmitter within the communication area, but it is disturbed by other apparatus, the decoded output from the receiver may contain interruption in sound or picture or contain noise. However, it is not possible to know on the spot whether such interruption in sound or picture or noise is due to transmission from outside the communication area or due to disturbance by other apparatuses. In order to determine it, it is necessary to use a measuring device, e.g. a field strength measuring device, to monitor the reception field strength and know the signal receiving condition.

For example, a cellular phone is provided with a function to indicate when it is in an area outside the service area. Accordingly, if one cannot talk through the cellular phone, he or she can know it is because he or she is outside the service area, when he or she sees the screen on the cellular phone. Also, the cellular phone system employs a multi-channel access system, in which any one of a multiple frequencies can be used. Accordingly, if the reception by the cellular phone is disturbed by other apparatus, the frequency used by the cellular phone is automatically changed. Thus, it is less likely that cellular phones become to fail to communicate due to disturbance from other apparatus. In contrast, systems, such as a wireless microphone system, which neither change automatically the operating frequency nor have an out-of-communication-area indicating function, it is not possible to know the reception condition or to automatically improve the communication condition.

An object of the present invention is to provide a digital wireless receiver which can indicate the reception condition by taking advantage of properties of digital wireless transmission.

DESCRIPTION OF THE INVENTION

A digital wireless receiver according to the present invention includes signal receiving means. The receiving means is adapted to receive a modulated signal comprising a carrier signal modulated with a digital encoded train produced by error-correction encoding a digital signal train. Each of the digital signals forming the digital encoded train includes a plurality of bits. Needless to say, each of digital encoded signals forming the digital encoded train is formed of plural bits. Demodulating means demodulates the received modulated signal to recover the digital encoded train. Taking advantage of the digital encoded train's being error-correction encoded, the digital signal train is recovered from the demodulated digital encoded train in the demodulating means. The digital wireless receiver according to the present invention is provided with received-signal strength detecting means which develops a received-signal strength indicative signal indicative of the strength of the received modulated signal. Bit error rate computing means computes a bit error rate when the modulated signal is being demodulated in the demodulating means. Decoding means performs error correction during the demodulation, taking advantage of error correction encoding provided for the digital encoded train. The bit error rate is determined by counting the number of bit errors found in the error correction processing, and computing a ratio of the number of the bit errors to the number of bits of the digital encoded train read in a given time period. The received-signal strength indicative signal and the bit error rate are inputted to judging means, which makes judgment, based on these inputs, which one of a plurality of reception conditions defined by received-signal strength indicative signals and bit error rates, the current reception condition corresponds to. The plural reception conditions may include a satisfactory reception condition, an out-of-communication-area communication condition, an on-the-border-of-communication-area communication condition, a disturbing signal reception condition, a receiver failure condition, etc.

When only the received-signal strength is used to determine the reception condition of the receiver, the cause for improper signal reception cannot be known because the received-signal strength increases even when a disturbing signal is received. For digital wireless receivers, a disturbing audio signal wave cannot be heard as an ultimate sound signal but is heard as noise. In such cases, it is particularly hard to determine the cause. On the other hand, if only the bit error rate is used to know the reception condition, it is also hard to determine the cause for improper reception condition because the bit error rate increases not only when the received-signal strength is small, but also when the signal of large strength is interfered with a disturbing signal.

Because the digital wireless receiver according to the present invention is arranged to determine the cause of unsatisfactory reception, based on the received-signal strength and the bit error rate, it can correctly know the reception condition. For example, when the received-signal strength is large and the bit error rate is also large, the receiver can be judged to be in a reception condition where a disturbing wave gives large influences. If the received-signal strength is small and the bit error rate is large, the receiver can be judged to be in a reception condition where the receiver is in an out-of-communication area. If the received-signal strength and the bit error rate are ones between the respective values in the above-described two reception conditions, it may be judged that the receiver is close to the border of the communication area. When the received-signal strength is large with a small bit error rate, the receiver can be judged to be in a satisfactory signal reception condition. If the bit error rate is small with a small received-signal strength, the receiver may be judged to have failed since such situation usually does not occur. As described, by the use of both of the bit error rate and the received-signal strength, it is possible to correctly grasp in what signal reception condition the receiver is.

The judging means may contain a reference table having stored therein various signal reception conditions indexed to various received-signal strengths and various bit error rates. Determining means determines a reception condition from the reference table, which corresponds to the computed bit error rate and the received-signal strength.

BEST MODE FOR EMBODYING THE INVENTION

Figure 1:
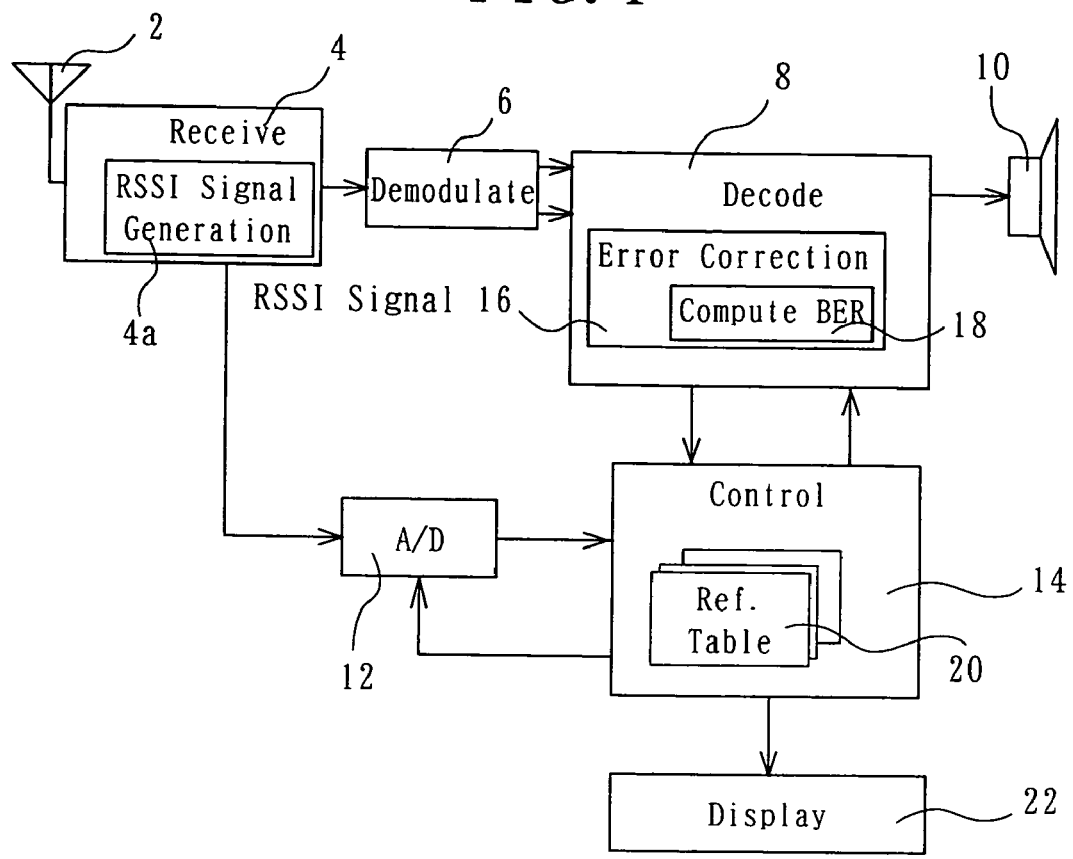
FIG. 1 is a block circuit diagram of a receiver for a digital wireless microphone, according to one embodiment of the present invention.

A digital wireless receiver according to one embodiment of the present invention is a receiver for, for example, a digital wireless microphone. As shown in FIG. 1, the receiver has a receiving antenna 2, which receives a modulated signal, e.g. a transmitted signal, from a transmitter, e.g. a wireless microphone.

In a digital wireless microphone system, an audio frequency signal, e.g. a sound signal, collected by sound collecting means, e.g. a microphone, is applied to an A/D converter and sampled at a predetermined sampling frequency to thereby convert it into a digital signal including a predetermined number of bits. Thus, the A/D converter outputs a digital signal at the predetermined sampling frequency. These digital signals form a digital signal train. The digital signal train is error-correcting encoded, which enables error correction, and whereby a digital encoded train is formed. Any one of known error correcting encoding techniques can be employed. A carrier signal, which is a high frequency signal at a predetermined frequency, is modulated with the digital encoded train. The modulated signal is transmitted via a transmitting antenna of the wireless microphone.

The modulated signal received at a receiving antenna 2 of the digital wireless microphone receiver is applied to receiving means, e.g. a receiving section 4, where the modulated signal is converted to a predetermined intermediate frequency signal and outputted.

The intermediate frequency signal is applied to demodulating means, e.g. a demodulating section 6, where it is demodulated, and the digital encoded train and a clock recovered from the digital encoded train are provided. The digital encoded train and the clock are coupled to decoding means, e.g. a decoding section 8, where the digital encoded train is decoded into the digital signal train. The digital signal train is, then, subjected to digital-to-analog conversion, and, the resultant signal is applied to a loudspeaker 10.

Figure 2:
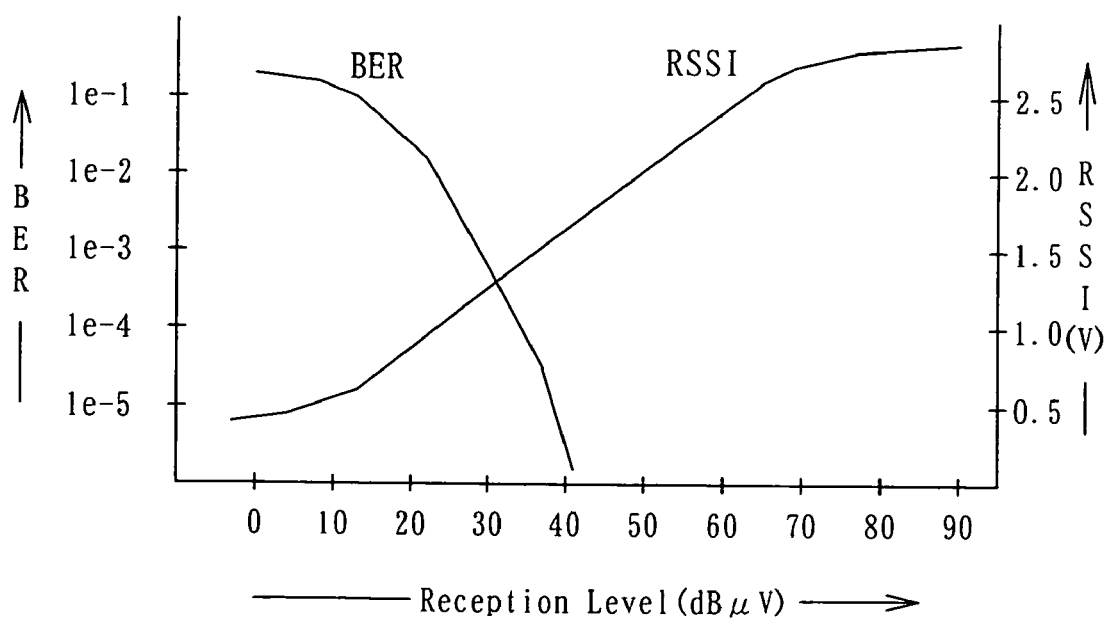
FIG. 2 shows the relationship of a bit error rate to a reception level and the relationship of a received-signal strength indicative signal to the reception level in the receiver shown in FIG. 1.

The receiving section 4 is provided with received-signal strength detecting means, e.g. a received-signal strength indicative (RSSI) signal generating unit 4a, which provides a received-signal strength indicative signal. The received-signal strength indicative signal is generally proportional to the reception level of the modulated signal as received at the receiving antenna 2, as shown in FIG. 2. For example, the received-signal strength indicative signal is proportional to the reception level within a range of from about 10 dBµV to about 60 dBµV. The received-signal strength indicative signal is converted to a digital received-signal strength indicative signal in an A/D converter 12 and applied to judging means, e.g. a control section 14.

The decoding section 8 includes an error correcting unit 16 for correcting an error added to a signal during the transmission from the transmitter to the receiver, where error correction is achieved when the digital encoded train is decoded into the digital signal train. The error correction is done in accordance with the error correction encoding provided on the digital wireless microphone side. The error correcting unit 16 determines whether or not each of the digital signals forming the respective digital signal train contains error, and, if present, corrects such error.

The error correcting unit 16 includes also bit error rate computing means, e.g. a bit error rate computing unit 18, which counts errors detected during the error correcting processing and computes a bit error rate (BER) representing the number of error bits contained in the digital signal trains read in a predetermined unit time to the total number of bits in the digital signal trains. As shown in FIG. 2, for example, the bit error rate is large, about 1e-1 (which means that one of ten bits is an error bit), when the reception level is low, e.g. about 10 dBµV. As the reception level becomes higher, e.g. about 40 dBµV, the number of error bits decreases to about 1e-5 (which means that one of one hundred thousand (100,000) bits is an error bit). The bit error rate is also applied to the control unit 14.

The control unit 14 may be formed of a CPU, for example, and includes reference tables 20. Using the reference tables 20, the control unit 14 determines which one of the reception conditions shown, for example, in FIG. 3 the digital wireless microphone receiver is in. The reception conditions may be an equipment (receiver) failure condition indicated by a letter "a", an out-of-communication-area communication condition indicated by a letter "b", an on-the-border-of-communication-area communication condition indicated by a letter "c", a disturbing signal reception condition indicated by a letter "d", and a satisfactory reception condition indicated by a letter "e".

The determination of the reception condition may be done in the following manner, for example. In FIG. 2, the received-signal strength indicative signal is prepared based on the reception level, and, therefore, is determined uniquely, so that it can be determined with consistency. On the other hand, although the bit error rate is correlated to some extent with the reception level as described above, it is not uniquely determined and varies to some extent. The bit error rates shown in FIG. 2 are average or normal values. In other words, the bit errors occur randomly. Accordingly, if the time for measuring the bit error rate is insufficient, the measured bit error rates will have varying values. By measuring the bit error rates for a sufficient time period, they converge on a fixed value. FIG. 2 shows such convergence values as average values.

Figure 4:
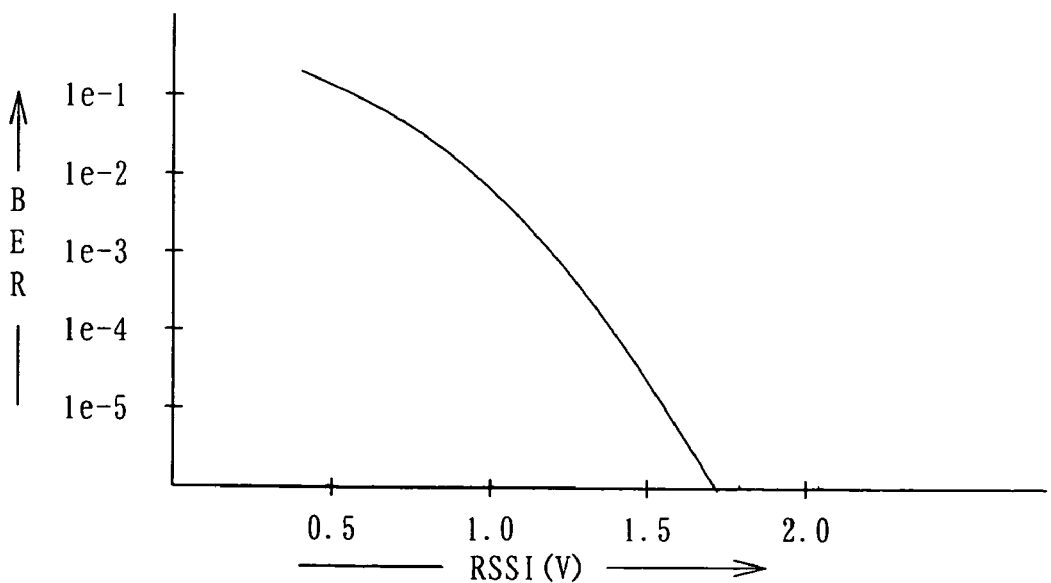
FIG. 4 shows the relationship between the bit error rate and the received-signal strength indicative signal in the receiver of FIG. 1.
Figure 5:
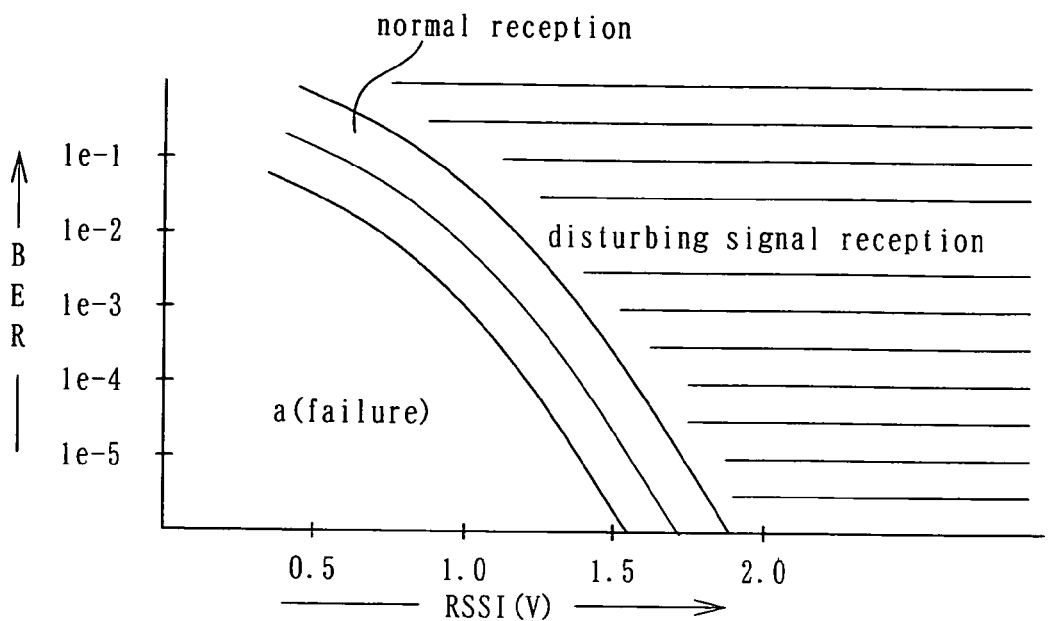
FIG. 5 is a diagram corresponding to that of FIG. 4, with a failure condition and a disturbing signal reception condition additionally shown.

What the control unit 14 bases its judgment on are the received-signal strength indicative signal and the bit error rate, and, therefore, the relationship, derived from FIG. 2, between the received-signal strength indicative signal and the bit error rate can be expressed by a curve shown in FIG. 4. The curve represents a relationship such that, for example, as the received-signal strength indicative signal increases, the bit error rate decreases in a range of from a first condition in which the received-signal strength indicative signal has a predetermined first received-signal strength indicative value and the bit error rate has a predetermined first bit error rate value, to a second condition where the received-signal strength indicative signal has a predetermined second received-signal strength indicative value larger than the first received-signal strength indicative value and the bit error rate has a predetermined second bit error rate smaller than the first bit error rate. Since, as described above, the bit error rate exhibits variety in values, a marginal range determined, taking into account an allowable width for variations, is set on opposite sides of the curve, as shown in FIG. 5. In other words, the bit error rates on the curve are translated by a predetermined value in both the increasing and decreasing directions of the received-signal strength indicative signal value, whereby two curves are drawn. The marginal range is a range defined between the two curves. The reception condition in which the received-signal strength indicative signal and the bit error rate are within the marginal range is a reception condition under a normal environment, i.e. the normal reception condition. When the received-signal strength indicative signal and the bit error rate are in this normal reception condition, there are substantially no breakings in sound and picture. The reception condition and also the bit error rate may change in the normal reception condition, depending on the transmission level and the distance of the receiver from the transmitter.

Normally, it does not occur that the bit error rate is below the bit error rate range of the normal reception condition when the received-signal strength indicative signal is below the received-signal strength indicative signal range of the normal reception condition. Accordingly, if a situation occurs in which the received-signal strength indicative signal is below the received-signal strength indicative signal range of the normal reception condition and the bit error rate is below the bit error rate range of the normal reception condition, such situation is judged to be failure of the receiver.

It may be considered that the reception is affected by a disturbing wave when the received-signal strength indicative signal is above the received-signal strength indicative signal range of the normal reception condition and the bit error rate is above the normal reception signal strength indicative signal range. Then, it is judged to be a disturbing signal reception condition.

When the received-signal strength indicative signal is within the received-signal strength indicative signal range of the normal reception condition with the bit error rate being within the bit error rate range of the normal reception condition, there is no failure of the receiver and a signal can be received without being affected by a disturbing wave. Now, the normal reception condition where the bit error rate is smaller than a given value, e.g. 1e-5, is considered as a good reception condition as indicated by letters "e1" in FIG. 6. In the disturbing wave receiving range, if the bit error rate is within a range of less than 1e-5, as indicated by letters "e2" in FIG. 6, no practical problems will be raised, in spite of influence of such disturbing wave, since there are few bit errors occurring. The combination of the regions with the letters "e1" and "e2" attached is the satisfactory reception condition with the letter "e" attached thereto shown in FIG. 3.

Figure 6:
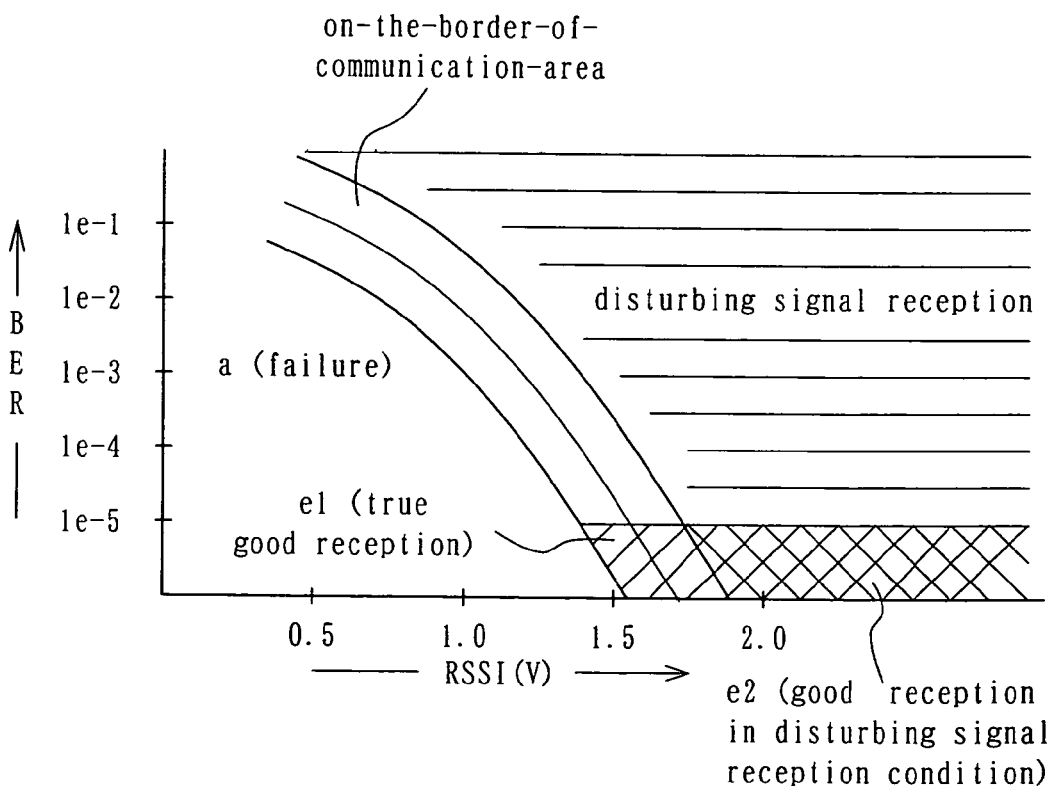
FIG. 6 is a diagram corresponding to that of FIG. 5, with a satisfactory reception condition additionally shown.

In the normal reception range, if the bit error rate is above a predetermined value, e.g. equal to or larger than 1e-5, the reception level is low and the bit error rate is high. Therefore, such region is considered as a region near the border of the communication area, as indicated in FIG. 6. In the region near the border of the communication area, many bit errors occur, but communications are possible. Accordingly, only if the perfect error correction is provided, there will be no noise. However, slight environmental changes, e.g. a slight change in distance between the transmitter and the receiver, may cause noise or lower the reception level, so that communication may become impossible.

Figure 3:
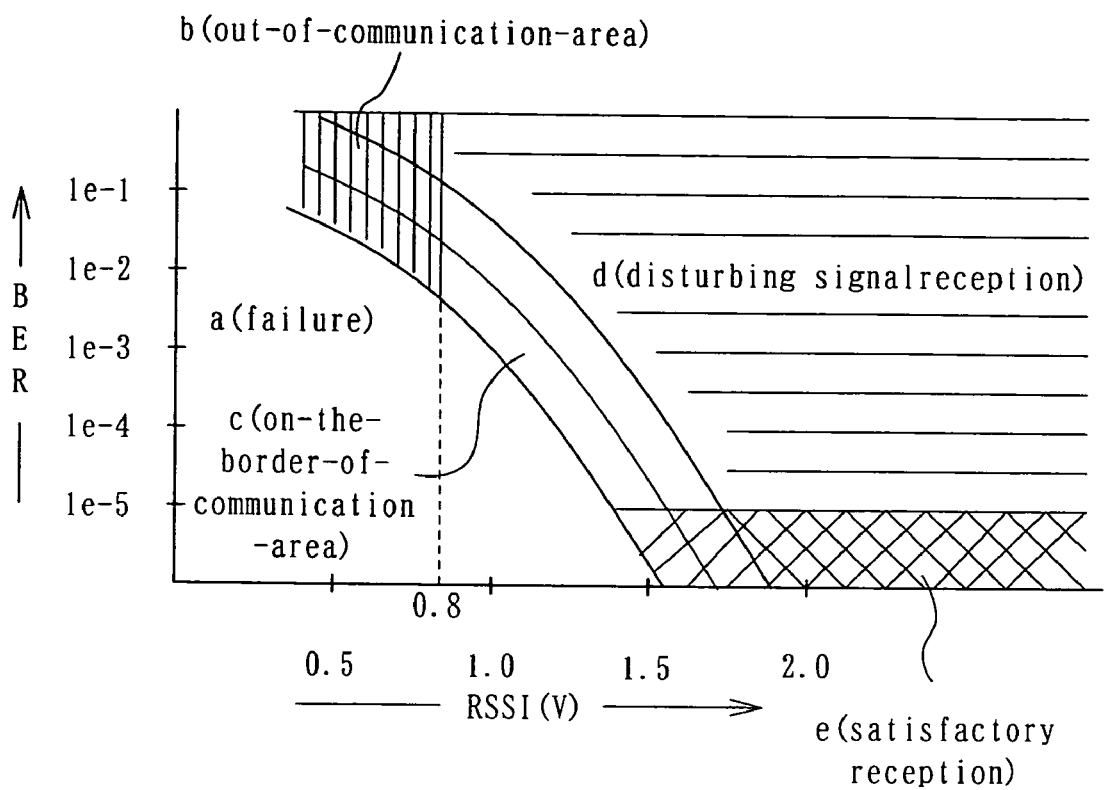
FIG. 3 shows reception conditions determined by the received-signal strength indicative signal and the bit error rate in the receiver of FIG. 1.

A receiver is arranged to judge that it is in an unsatisfactory reception condition when the reception level becomes below a predetermined value, and a muting circuit in a receiving circuit or output circuit thereof is activated, to thereby prevent noise from being developed. Then, a region in the on-the-border-of-communication-area where the reception level is below the level necessitating the muting, i.e. where the received-signal strength indicative signal is below 0.8 V, for example, that corresponds to the reception level necessitating the muting, is judged to be the out-of-communication area, as shown in FIG. 3.

The reference tables 20 are used in making such judgment. The reference tables 20 are provided for respective ones of the bit error rates, and store therein the reception conditions corresponding to the respective values of the received-signal strength indicative signals at the respective bit error rates. The reference table 20 to be referenced to for the bit error rate is determined, the received-signal strength indicative signal is inputted to the determined reference table, and the reception condition for the received-signal strength indicative signal is read out.

Specifically, a received-signal strength indicative signal is measured plural times during one measurement of a bit error rate, and the plural measurements of the received-signal strength indicative signal is averaged. The average received-signal strength indicative signal and the measured bit error rate are inputted to the reference table 20 to determine the reception condition. For higher precision, the determination of reception condition is carried out plural times, and the result is displayed as the judgment of the reception condition, on a display 22 associated with the control unit 14. If the result indicates that the individual reception conditions occur at the same frequency, a result of judgment is "unstable reception".

Figure 7:
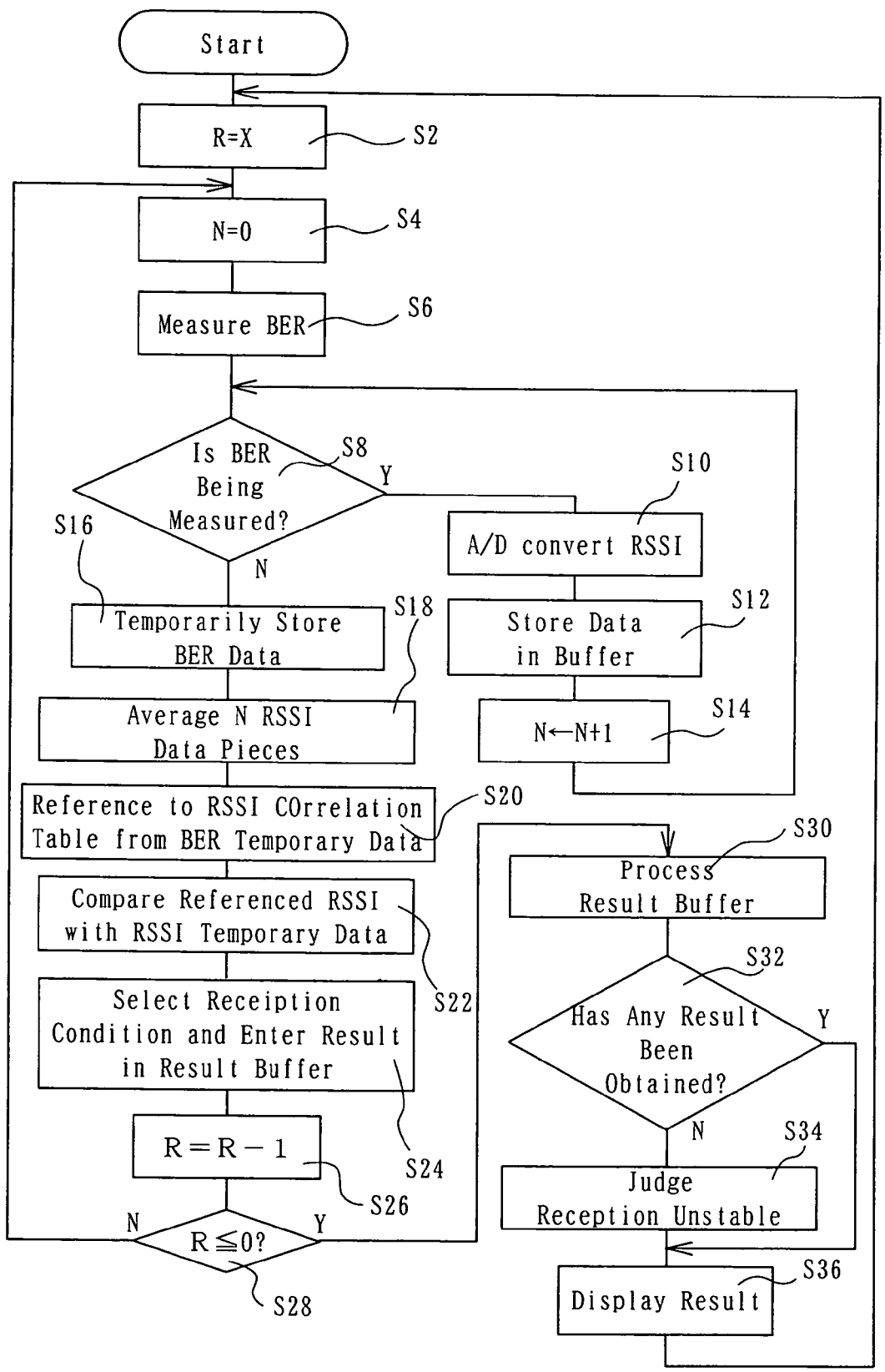
FIG. 7 is a flow chart of the operation of the receiver of FIG. 1.

FIG. 7 is a flow chart for judging the reception condition by means of the control unit 14. In this judgment processing, first a predetermined number, e.g. X, is set as a count R in a counter which counts the number of times the determination of the reception condition is to be done (Step S2). Next, a count in a counter N is set to zero (0), which counter counts the number of times the received-signal strength indicative signal has been measured for one determination of the reception condition (Step S4). This completes the initial setting.

Next, the measurement of the bit error rate is started (Step S6). Then, whether the bit error rate is being measured is judged (Step S8). If the measurement is being made, the received-signal strength indicative signal is converted to a digital received-signal strength indicative signal in the A/D converter 12 (Step S10), and the resulting data is stored in a buffer provided for the control unit 14 (Step S12). Then, the count in the counter N is incremented by one (1) (Step S14). The processing returns to Step S8. This means that while the bit error rate is being measured, the received-signal strength is also measured.

When the bit error rate measurement is completed (i.e. when the answer to the query in Step S8 is NO), the bit error rate is temporarily stored (Step S16), and the N digital received-signal strength indicative signals stored in the buffer are averaged (Step S18).

Then, the temporarily stored bit error rate is used to determine which one of the reference tables 20, defining the relation between reception conditions and received-signal strength indicative signals, should be referenced to (Step S20). Next, it is determined which one of the received-signal strength indicative signals in the determined reference table 20 the averaged received-signal strength indicative signal corresponds to (Step S22) to determine the reception condition, and the determined reception condition is stored in a result buffer (Step S24). The count in the counter R is decremented by one (1) (Step S26), and a judgment as to whether the count in the counter R has become zero (0) or less (Step S28). The processing of from Step S4 to Step S28 is repeated until the judgment in Step S28 becomes YES. When the answer to the query in Step S28 becomes YES, the judgments for the X reception conditions are collected in the result buffer.

When the answer to the query in Step S28 becomes YES, the reception conditions in the result buffer are processed together (Step S30), and whether any result has been obtained or not is judged (Step S32). Let it be assumed that it has been determined that, for example, for X=10, the satisfactory reception has occurred seven times, the on-the-border-of-communication-area reception has occurred once, the out-of-communication area reception has occurred once, a disturbing wave reception has occurred once, and the device failure has occurred zero times. The most frequently occurring reception, i.e. the satisfactory reception is adopted as the ultimate judgment. If no substantial difference is present in number of occurrences among the respective reception conditions, the ultimate judgment is "unstable reception" (Step S34). The obtained ultimate judgment is displayed on the display 22.

When reception is degraded, a user can see the display on the display 22 to know which is the cause for such reception degradation, transmission from out of the communication area, transmission from a place on the border of the communication area, failure of the receiver, or disturbing waves, and, therefore, the user can take an action against it immediately.

The present invention has been described to be embodied in a receiver for a digital wireless microphone, but it is not limited to such receiver. Rather, the present invention can be used for various receivers which are adapted to receive digital modulated signals. According to the described embodiment, a reference table to be used is determined in accordance with a bit error rate, and a reception condition is determined from the determined reference table in accordance with a received-signal strength indicative signal. However, a reference table, which, in this case, stores therein a relationship between bit error rates and reception conditions, may be determined in accordance with a received-signal strength indicative signal, and a reception condition is determined from the reference table in accordance with a bit error rate. Also, according to the described embodiment, a received-signal strength indicative signal is converted into a digital received-signal strength indicative signal in the A/D converter 12 for application to the control unit 14. However, without using the A/D converter 12, a received-signal strength indicative signal, which is an analog signal, may be compared, in judging means, with a plurality of threshold values determined in accordance with bit error rates to determine a reception condition. This latter arrangement enables simplification of circuitry, high-speed operation, and power saving.

The invention claimed is:

1. A digital wireless receiver comprising:
  receiving means for receiving a modulated signal including a carrier signal modulated with a digital encoded train, said digital encoded train comprising an error-correction encoded digital signal train;
  demodulating means for demodulating the received modulated signal to provide said digital encoded train;
  decoding means for decoding said digital encoded train to provide said digital signal train;
  received-signal strength detecting means for developing a received-signal strength indicative signal indicative of a received-signal strength of said modulated signal;
  bit error rate computing means for computing a bit error rate during said decoding; and
  judging means to which said received-signal strength indicative signal and said bit error rate are inputted, said judging means judging, from the inputted received-signal strength indicative signal and bit error rate, which one of a plurality of signal reception conditions a current reception condition is in;
  wherein said plurality of signal reception conditions comprise a receiver failure condition, an out-of-communication-area communication condition, and a disturbing signal reception condition;
  said conditions being defined by first, second and third received-signal strength versus bit error curves, said curves being defined in a coordinate plane in which said received-signal strength is allocated along the horizontal axis and said bit error rate is allocated along the vertical axis;
  said first received-signal strength versus bit error curve being such that said bit error curvilinearly decreases with increase of said received-signal strength along said first curve, said second received-signal strength versus bit error curve being obtained by shifting said first curve leftward in said coordinate plane, said third received-signal strength versus bit error curve being obtained by shifting said first curve rightward in said coordinate plane;
  said judging means judging said current signal reception condition to be said receiver failure condition when the combination of said received-signal strength and bit error is in a first range, which is leftward of said second curve in said coordinate plane;

said judging means judging said current signal reception condition to be said out-of-communication-area communication condition when the combination of said received-signal strength and bit error is in a second range, which is leftward of a portion of a first straight line above a first intersection of said first straight line with said second curve and above a portion of said second curve leftward of said first intersection, said first straight line being in parallel with said vertical axis and passing a predetermined value of said received-signal strength;

said judging means judging said current signal reception condition to be said disturbing signal reception condition when the combination of said received-signal strength and bit error is in a third range, which is rightward of a portion of said first straight line above a second intersection of said first straight line with said third curve, above a portion of a second straight line passing a predetermined value of said bit error in parallel with said horizontal axis, said portion of said second straight line being rightward of a third intersection of said second straight line with said third curve, and rightward of the portion of said third curve between said second intersection and said third intersection.

2. The digital wireless receiver according to claim 1 wherein said judging means includes a reference table having various signal receiving conditions stored therein, said various signal receiving conditions being indexed to various received-signal strengths and bit errors, and determining means for determining, from said reference table, a signal receiving condition corresponding to said inputted bit error rate and received-signal strength indicative signal.

* * * * *